United States Patent [19]

Millman et al.

[11] Patent Number: 5,490,243

[45] Date of Patent: Feb. 6, 1996

[54] DATA PROCESSING SYSTEM FOR MULTI-PLATFORM PRINT CONTROL AND ELECTRONIC DATA FILL

[75] Inventors: Frank Millman, Miami Beach; Phillip Bolin, Boynton Beach; Frank E. Haggar, Boca Raton; H. Richmond Ackerman, Ft. Lauderdale, all of Fla.

[73] Assignee: F3 Software Corporation, Burlington, Mass.

[21] Appl. No.: 838,479

[22] Filed: Feb. 19, 1992

Related U.S. Application Data

[63] Continuation-in-part of Ser. No. 628,435, Dec. 13, 1990, abandoned.

[51] Int. Cl.⁶ .................................................. G06F 15/00
[52] U.S. Cl. ......................... 395/148; 395/144; 395/146
[58] Field of Search ................................. 395/144–149, 395/101

[56] References Cited

U.S. PATENT DOCUMENTS

| | | | |
|---|---|---|---|
| 4,939,670 | 7/1990 | Freiman et al. | 364/519 |
| 5,091,868 | 2/1992 | Pickens et al. | 395/148 |
| 5,170,467 | 12/1992 | Kubota et al. | 395/148 |
| 5,233,683 | 8/1993 | Sasaki | 395/110 |
| 5,235,675 | 8/1993 | Sudoh | 395/109 |
| 5,299,304 | 3/1994 | Williams et al. | 395/145 |
| 5,299,305 | 3/1994 | Oomae et al. | 395/145 |
| 5,319,546 | 6/1994 | Nishino | 395/148 |

OTHER PUBLICATIONS

Taylor, "Using Lotus Spreadsheet for Desk Mate", Que, Corp. (1990), pp. 55–70, 121–169, and 179–201.
"The Layered Worksheet", Lotus (Jul. 1989), pp. 96–98.
Grout, "The Mac Goes Pro Forma", MacWorld, vol. 2 No. 7 (Jul. 1985), pp. 84–88.

*Primary Examiner*—Heather R. Herndon
*Assistant Examiner*—Rudolph Buchel
*Attorney, Agent, or Firm*—Hopgood, Calimafde, Kalil & Judlowe

[57] ABSTRACT

A data processing system utilizes the controlled output of complex forms in one of several different output devices without separate re-engineering of the form specification file. The system iteratively qualifies the form objects in the form file, modifying all objects that are not supported by the designated output device driver. A separate output control file is created with the support commands necessary to implement the form in a desktop, centralized, or production output format. In a separate aspect, the same form structure includes datablock locations permitting electronic completion and fill of selected entries. In this manner, the form can be ported to various locations for data collection and conformation without the existence of hardcopy versions.

8 Claims, 6 Drawing Sheets

FIG. 1

FIG. 2 DESKTOP

FIG. 3 CENTRALIZED PRINTERS.

FIG. 4a ELECTRONIC FILL

DATA PROCESSING SYSTEM FOR MULTI-PLATFORM PRINT CONTROL AND ELECTRONIC DATA FILL

STATEMENT OF RELATED CASE

This application is a continuation-in-part of U.S. patent application Ser. No. 07/628,435, now abandoned, which is further incorporated by reference as if restated in full.

The present invention is directed to a data processing system for electronic fill of select data fields and generating composite commands for diverse output systems. More particularly, the present invention is directed to the program controlled methods and apparatus required to permit a single design session for supporting (1) several dramatically different output systems of complex, graphic and image intensive forms, and (2) the electronic completion of diverse form structures prior to final output.

BACKGROUND OF THE INVENTION

Abandoned U.S. patent application Ser. No. 07/628,435 entitled "PROGRAM CONTROLLED SYSTEM FOR FORMS ENGINEERING" is directed to a system supporting the development of specifications for forms that range in complexity from simple, single page text-based documents to forms characterized by a plurality of distinct features including, inter alia, graphic and image based information, multi-page format, differing font styles, carbon and carbonless reproduction, perforation management, and color contrast. The above system further permits the development of engineering and manufacturing information as part of the specification.

In this context, the above-described system provides an extremely flexible, simple to use mechanism to prepare simple and more complex forms as may be dictated by the user. In that embodiment, the focus was on the more complex forms, and the control parameters used to permit production printing on a commercial print shop scale. There are, of course, many other print output systems employed in the normal course of business. These print systems will range the entire spectrum, from desktop laser printers to the large in-house XEROX printers used by many Fortune 500 corporations. In addition, electronic forms are used on computer workstations and networks for the collection, validation and processing of information completely on screen.

In the past, forms were engineered for a specifically delineated print engine, and were, therefore, limited to that engine or similarly structured print systems. This required that the same form be re-engineered for each of the differing print engines contemplated as an output device; an expensive and time consuming process. Moreover, forms engineered for specific print engines could not be used for electronic data collection and routing per se.

SUMMARY AND OBJECTS OF THE PRESENT INVENTION

It is, therefore, an object of the present invention to provide a data processing system that permits the design of a single form specification capable of controlling the print output of distinct print engines in a simplified and integrated manner.

It is another object of the present invention to provide a program controlled computer system that converts the forms specification, including electronic data fill features, into a format compatible to one of several distinct print engines.

It is a further object of the present invention to provide a method of processing information corresponding to text, graphics, image, dimensional, and color characteristics of a pre-defined form, and convert these characteristics to match the capabilities of the print engine defined for output.

It is still another object of the present invention to provide a data processing system that allows electronically created and stored forms to be used for data collection and validation, gathering of graphics rules, text and text placement, and mapping information used by electronic fill.

The above and other objects of the present invention are realized in an illustrative data processing system that incorporates a program controlled processor with print output control, data storage, data fill-in, and data validation algorithms. Forms are created in a specialized format that comprises information on the form structure, dimensions, layering and other attributes, including the existence of separately formatted image files and embedded programming instructions for form completion. Included in this specification are specifically delineated field definitions. The selected and entered field definitions govern the source, display, and print formatting of designated data associated with the specific field. Source rules determine whether the data is to input from the keyboard, calculated from the contents of other fields, or generated by the system, e.g., date and time field values. Display rules govern the appearance of data once it is entered into a form, including multilingual currency rules, case shifting, alignment, and numeric formatting. Print rules govern whether e.g., zeros are suppressed on output. Finally, a programming language having the acronym "BLADE" is utilized for the purpose of writing instructions controlling the interaction of data among fields and between fields and external databases. This compilation of information is codified as a BLOC.FDB file (form database) with a specialized file structure.

The above operations are implemented through a program called F3 Fill. In this context, F3 Fill comprises the instructions governing the implementation of the electronic completion of a specific form. This program includes the specific algorithms executing the stored rules for input, display, and printing as these pertain to the datablocks designated for electronic fill.

A separate program called the Print Manager is employed to access the formatted form files for printing in a prescribed manner. In a process that is described in more detail below, the Print Manager reads the form file and generates a supplemental output control file corresponding to the desired print engine. This reformation process is complex as the form is composed of separate objects that must be sequentially prepared for printing on the designated output device. Image files must be restructured according to one set of rules, while text files are prepared by another. As the FDB file is processed and supplemental commands generated, the new output control file is created. This new file contains the instructions and data for printing the form, originally engineered for one environment, in a second entirely distinct printing environment.

The foregoing features of the present invention are more fully understood by reference to the following detailed description of a specific illustrative example thereof, taken in combination with the following figures of which;

DESCRIPTION OF THE PRESENT INVENTION

First briefly in overview, the present invention is directed to a data processing system for accessing form specification files having a pre-established format and several modules therein, and complementing the structure of the files to be compatible with one of several distinct printer output engines. The forms are prepared and stored in a specialized format using a system described in co-pending U.S. patent application Ser. No. 628,435, wherein the files are individually recognized by the path designation "filename.fdb". These files comprise a series of commands and instructions corresponding to different aspects of the form structure and design.

For example, the form may have one or more images; these images are separately stored files in association with the parent .fdb form file, but in a variety of bit matrix image formats. Appropriate per se well-known formats include Tag Image Format Files ("TIFF") and encapsulated postscript ("EPS") structures. Image files, due to their bit matrix structure, necessitate these specialized file formats. In addition, the form file will often include datablock fill instructions. These instructions are encoded in a separate, system readable language and determine the placement of select or calculated entries at defined locations within the form structure. Other file modules include text information at select fonts, and manufacturing data. Table I presents the salient elements of the form file structure:

TABLE I—FORM OBJECTS

A. Artwork and graphics
B. Manufacturing specifications
C. Reference Guidelines
D. Text Structures
  1. Scalable fonts
  2. Raster fonts
E. Reference to Image files
  1. TIFF image format
  2. EPS image format
F. Programming instructions
  1. Embedded intelligence
  2. Data fill locations The universe of files for printing is, therefore, quite large; in a corresponding fashion, the available print engines are numerous, each with its own set of idiosyncratic input-output requirements and capabilities. Of particular interest to the present system is the ability to port form files to print or output in one of several possible engine types from the same original form design. These are the desktop laser, the centralized printer, and the commercial printer (off-set or litho). Each of these output systems differs in dramatic fashion from the others in capabilities and requirements. The present system employs the unique file structure associated with the .fdb forms and, pursuant to the particular track chosen, conditions these files to correspond to the appropriate format for output. This involves the development of an output control file, generated to support the designated print engine.

Figure 1:
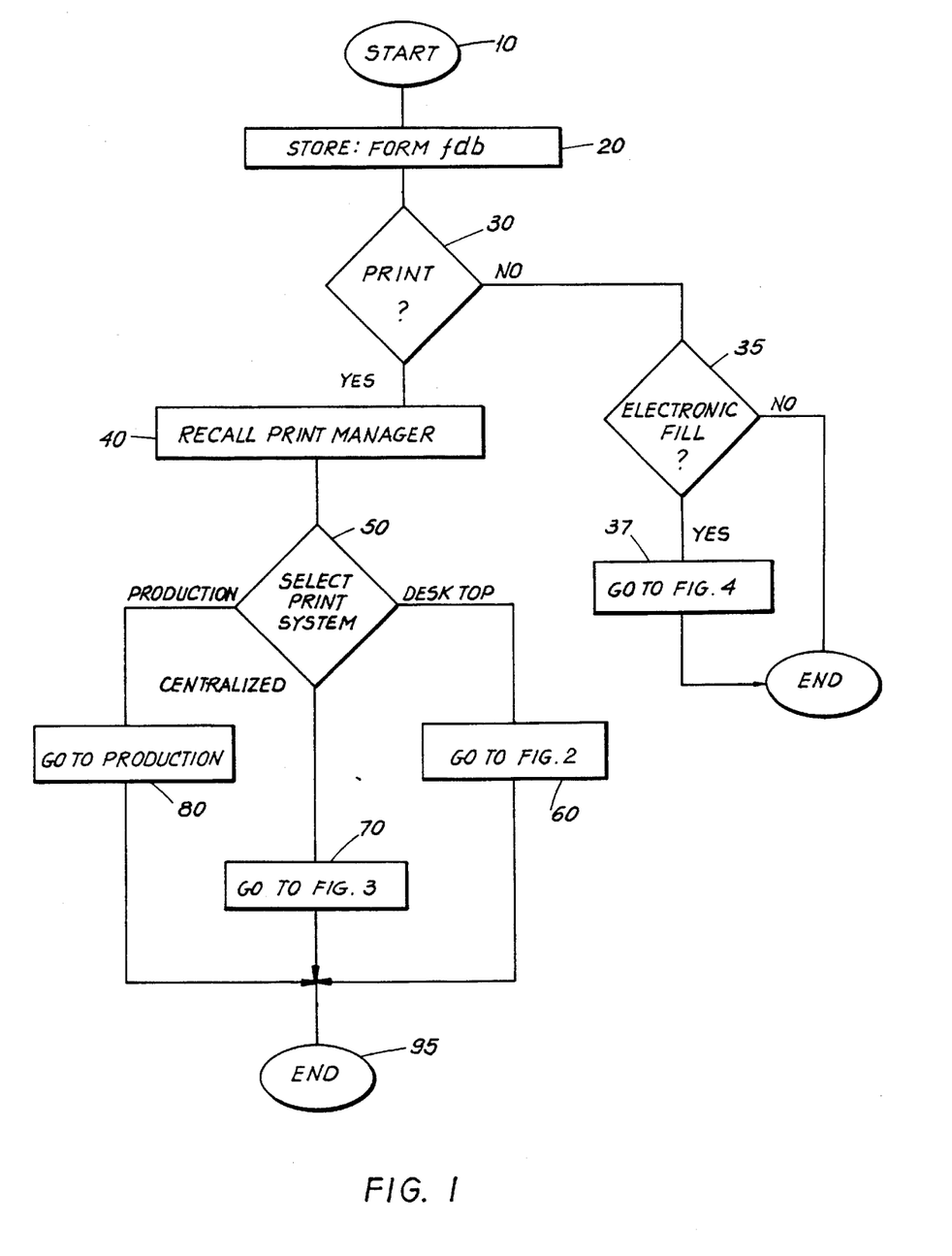
FIG. 1 presents the overall hierarchy for a multi-driver system in accordance with the present invention.

With the above brief description in mind, attention is now directed to FIG. 1, which depicts the flow of information as the system determines the appropriate steps necessary to support printing. The form is engineered per the interactive design session depicted in co-pending U.S. patent application Ser. No. 628,435. This results in a complex form file with the designated suffix .fdb containing a series of objects necessary to control the production printing of the form, which is stored in memory, block 20. In accordance with the co-pending application, this form specification file is used to control the output of a production print operation, block 80 in FIG. 1 herein.

Figure 4A:
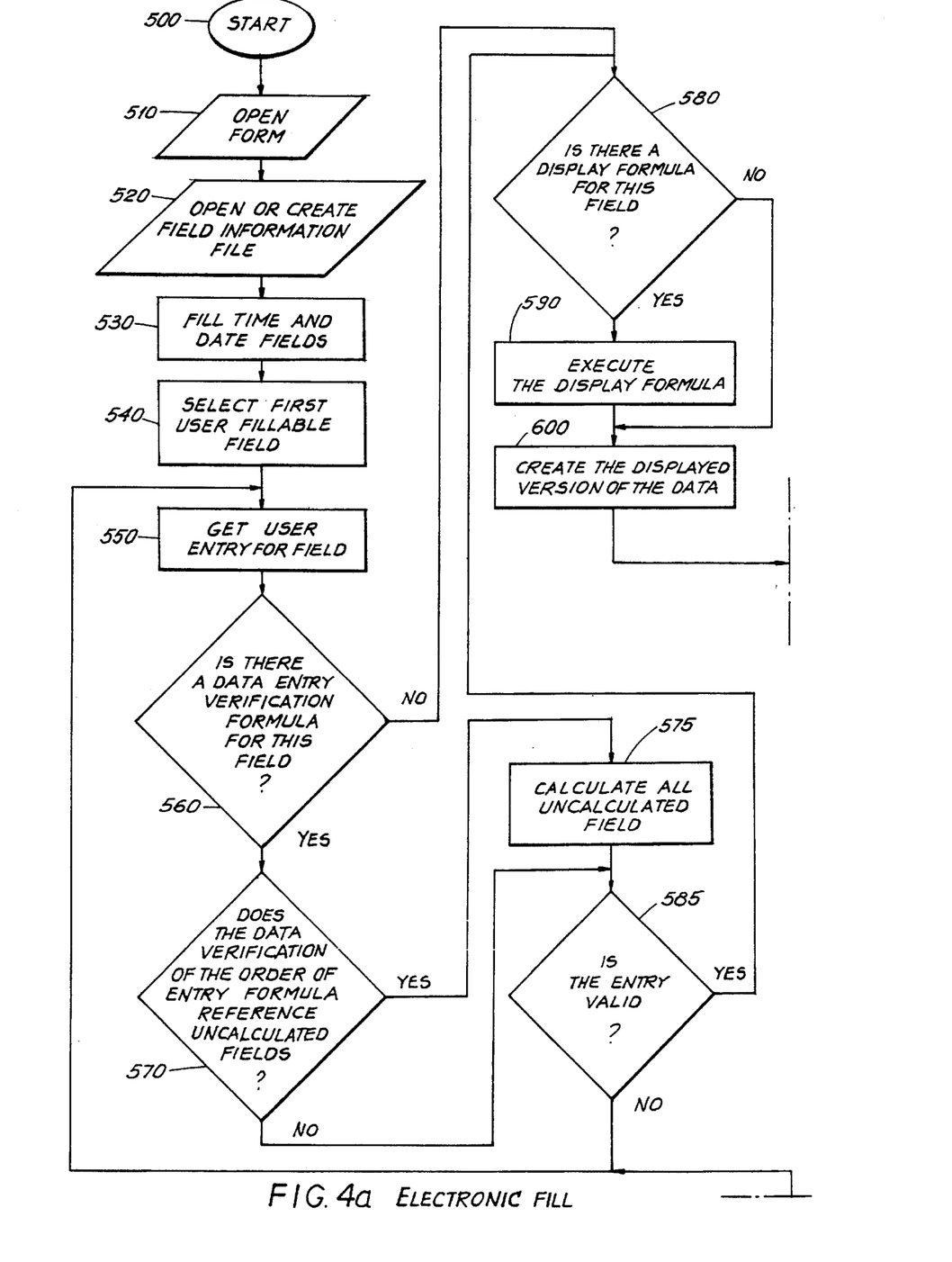
FIGS. 4(a)–4(c) provide flow chart representations of the logic path associated with the support of the electronic fill operation.
Figure 4B:
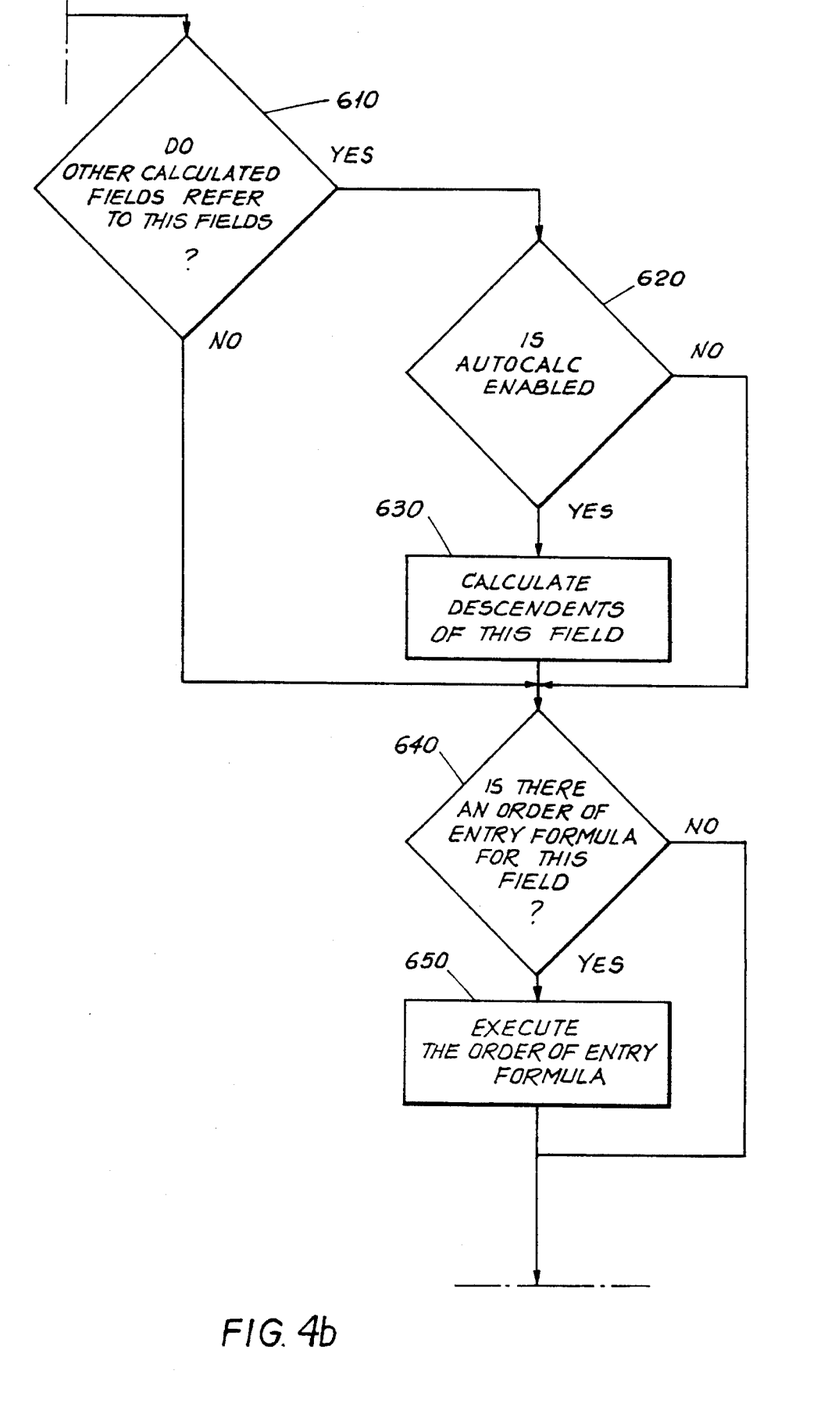
Figure 4C:
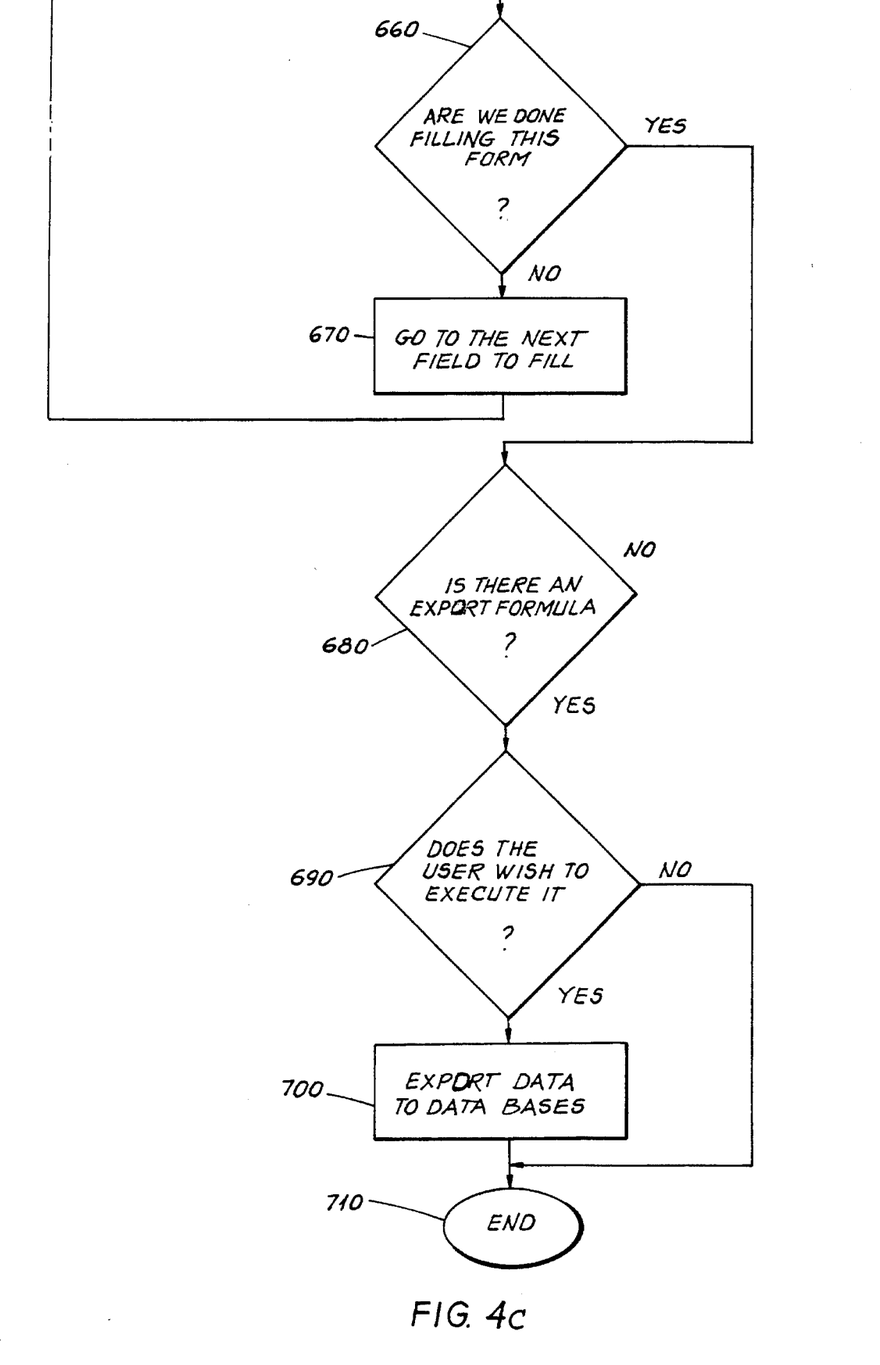

At test 30, the system user may enter the Electronic Fill module; a negative response to text 30 branches logic to test 35 and block 37. At block 37, system operation is shifted to F3 fill control, and proceeds in accordance with the flow chart presented in FIG. 4.

Other output modes are often contemplated and are depicted in FIG. 1. These are available through the Print Manager module, block 40, via positive response to test 30. The Print Manager module is a menu driven interface with the various options displayed to the user. The user makes a selection of the desired output system at test 50, shifting the controlling logic to either the desktop printer module, block 60; the centralized printer module, block 70; or the module for the production printer, block 80. After completion of the operative subroutine, logic may shift back to the Print Manager for further processing or terminate, via block 95.

Figure 2:
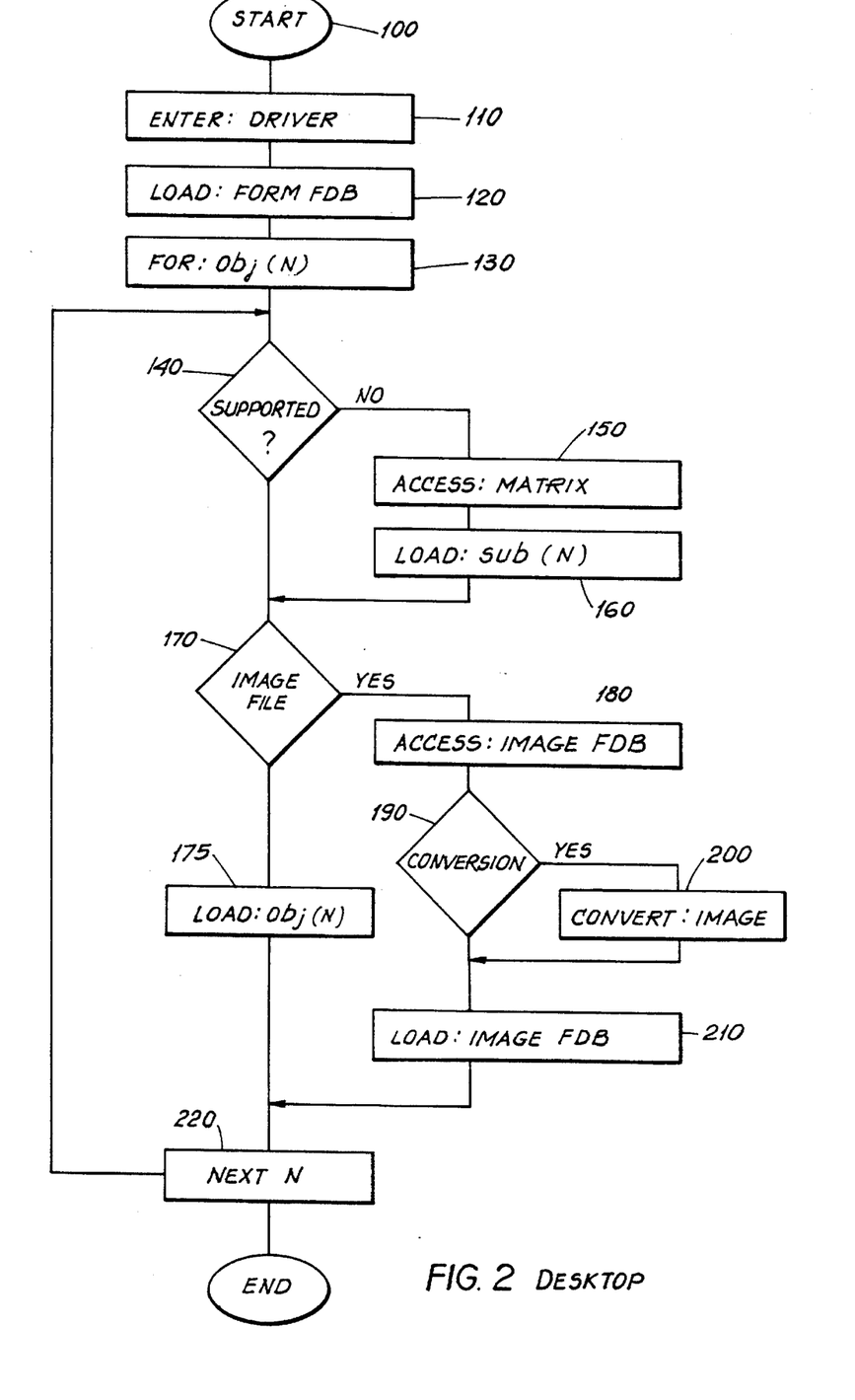
FIG. 2 provides a flow chart representation of logic path associated with the support of a desktop driver.

Turning now to FIG. 2, the logic path corresponding to printing in the desktop environment is presented. Logic conceptually begins at Start, block 100, and proceeds to block 110, wherein the Driver designation is entered. This designation is selected from a pre-formatted menu of available drivers. After selection of the Driver, the form specification is recalled from memory, block 120, having the sample path of form.fdb. The system then enters the operative loop, processing the form specification to insure driver compatibility.

As stated earlier, the form specification is constructed of individual Objects, i.e., elements that in combination provide the essence of the form design. These objects include the manufacturing lines, (e.g., fold placement) envelope windows, perforations, etc. Obviously many objects will be disregarded by the printer; others must be conformed to the printers capabilities. This is accomplished by iteratively processing each object, and creating an output control file based on the characteristics of the object vis-a-vis the final output.

Continuing with FIG. 2, this iterative process is presented by the "For" loop, block 130, using the counter variable N to track the object being transformed, i.e., Obj(N). At test 140, the system first determines whether the Driver will support the object in its native form. Common objects such as horizontal lines, simple graphics and text require no modification, resulting in a "yes" response to test 140. Other objects are not universally supported; if not supported, logic branches to block 150 and accesses a conversion matrix for modifying the object to conform to the Driver. In this matrix, unsupported objects are downgraded to a form supported by the Driver. An example of such an object would be a rectangle with rounded corners; a desktop printer will not normally allow the rounded corners for print-out and, therefore, rejects the object. To counter this, the system will provide a matrix entry wherein the rounded corners will default to a square corner downgrade for use on that Driver.

The modified or default object is stored in the output control file, block 160. Logic proceeds to test 170, wherein the existence of an image file is tested. If positive, logic branches to block 180 and the image file is accessed. If the image file is compatible with the output system, no conversion is necessary ("no" to test 190). If incompatible, logic branches further to block 200 where the image is converted to a compatible format. In either event, the image is stored with the output control file, block 210. Supported objects are also stored with the output control file, block 175. The process is then repeated for each object in the form specification file, block 220. After completion, logic terminates at block 230.

Figure 3:
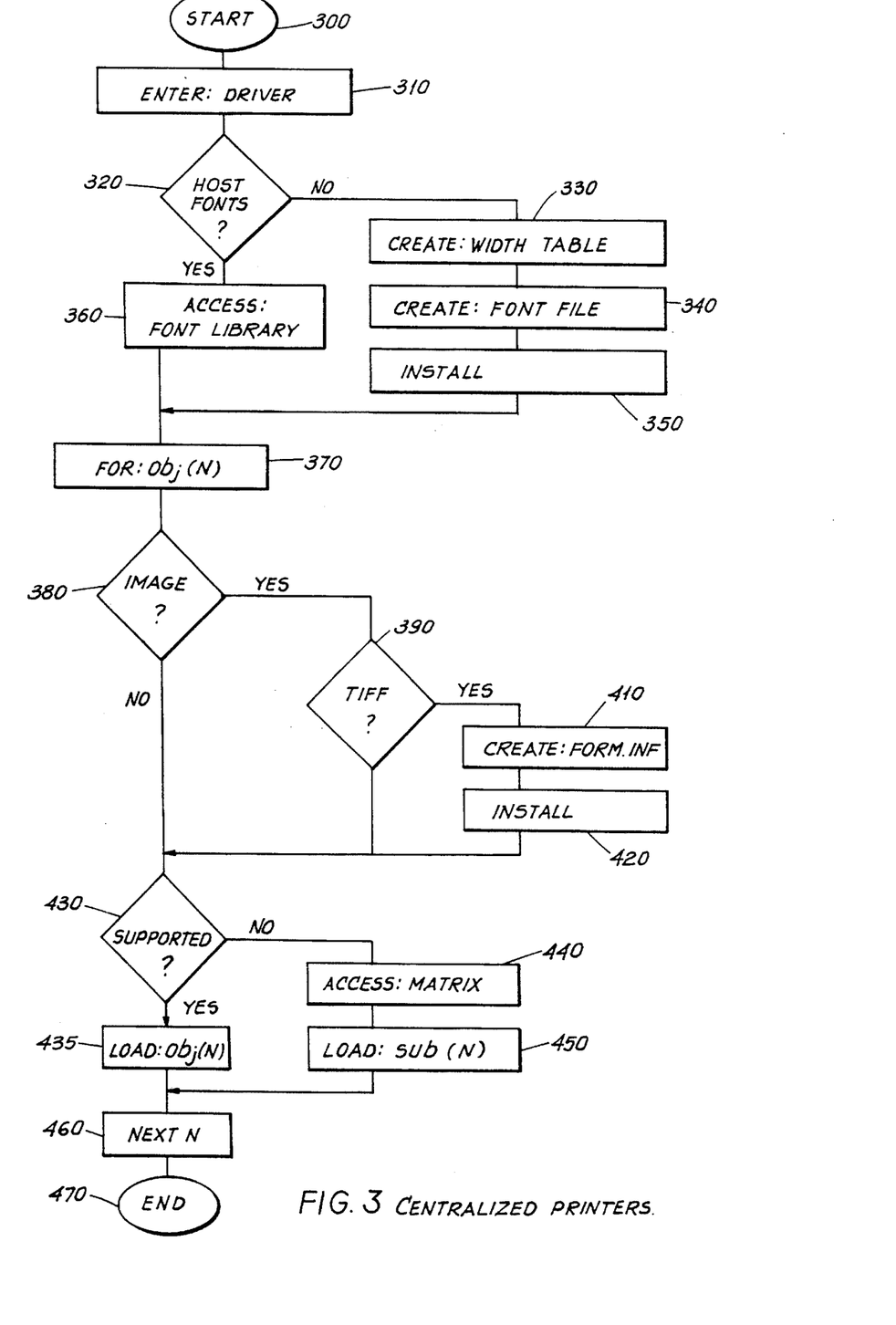
FIG. 3 provides a flow chart representation of the logic path associated with the support of a centralized driver.

Turning now to FIG. 3, the flow chart therein depicts the logic flow path for supporting the output and the creation of the output control file on a centralized printer. These large laser printers are used by corporations for in-house printing of big print jobs, and are exemplified by the model designations XEROX 9700 and IBM 3800.

Logic conceptually begins at block 300 and continues to block 310 wherein the device driver is entered. The first step is directed to conforming the font style to the output device. Stored in memory is a font library of compatible fonts; the system user may accept the use of these library fonts or select the Driver fonts in the output file, test 320. If the Driver fonts are chosen, these must be converted to a format compatible to the form specification file. This conversion process is two steps; the first step is the creation of a font width table, block 330, wherein the fonts are reformatted by width. The width table is then used to set the output file for the specific fonts called by the specification file, block 340, as transferred to the separate output control file, via install function, block 350.

If host fonts are selected, these are read directly into the output control file from the font library file, block 360. Logic then proceeds to the object loop for iterative processing of the form objects, Obj(N), block 370.

The first phase of this processing involves the conversion of image files into a format compatible with the centralized printer. Test 380 first confirms that the object is a remotely stored image; if so logic branches to test 390 to confirm that the originating format is a TIFF file. A positive response to this test branches further to block 410. At this junction, the system will call a conversion algorithm specific to the driver earlier designated. For example, if the driver is a XEROX centralized printer, the subroutine will include a program to convert the TIFF file into IMG file, which is then installed in the output control file, block 420. The IMG format corresponds to the XEROX image file structure for printing. A non-TIFF image file will default without disrupting system operation, ("no" to test 390). The foregoing steps may be accomplished off-line with about the same efficiency. The use of on-line processing offers some advantages in reduced command errors, etc., but will result in the same output command file.

Continuing in FIG. 3, test 430 determines whether the iteratively processed objects are supported; if not, logic branches to block 440 where the conversion matrix is accessed and the appropriately downgraded or modified object is stored in the output control file, block 450. Logic then returns to the core path, for the next object, terminating after all N objects have been processed.

The preceding discussion has focused on output devices for printing. With the advent of datablock forms, electronic mail, and facsimile technology, forms are often routed through an organization without printout. The form is alternatively retained as an electronic file that is on a computer workstation with keyed entry of data such as biographical information, signatures for approval, etc. Although ultimately reduced to hardcopy, these electronic forms spend most of their life in electronic memory, and, therefore, offer great efficiencies.

Datablocks are described in some detail in the above referenced patent application; in brief terms, a datablock is a location in the form matrix that also includes program instructions. An example of these instructions would be the extraction of data from another portion of the form to be added to the new section, e.g., the iterative completion of name, social security number etc. in multiple entries. These instructions are considered embedded intelligence, as they reside with the form file per se controlling the fill operation during the routing of the form. This is somewhat analogous to a relational database wherein entries in certain cells control the data in others.

With the foregoing in mind, attention is directed to FIG. 4, presenting the electronic fill (F3 Fill) processing module. Logic conceptually starts at block 500 and continues to block 510 wherein a selected form for electronic fill operation is opened. The system permits access to (or creates) a field information file, block 520. The fields for time and date are filled by system access to the time and date generators within the computer, block 530.

The system then iteratively processes each field for user input, block 540, wherein the data for the given field is entered via keyboard, block 550. At test 560, the system determines whether there is an entry verification formula associated with the field; an entry verification formula examines the format of the entered data and determines that the form of data comports or fails to comport to the expected form of data for that field. This is exemplified by entries associated with dates, e.g., birthdays having the expected month-day-year data structure. To insure proper evaluation, the system first tests whether data verification and order entry formulas reference uncalculated fields; if so the system logic branches to block 575 wherein all uncalculated fields are calculated. In either case, logic flows to test 585 to determine if the data entry is valid (matches expected entry structure) and in the right order. If so, logic continues to test 580; if not, logic reverses to the initial data entry sequence, block 550.

Continuing in FIG. 4, test 580 determines whether there is a display formula associated with the current field. If so, logic continues to block 590 executing the display formula and block 600 for displaying the data pursuant to the display formula dictates. In this context, the display formula rearranges the data according to some specific reference; if no display formula exists, the data is simply displayed as entered. At test 610, the system determines if other fields have calculations contingent on the entry in the current field; if so logic branches first to test 620, insuring that the autocalc module is enabled. Assuming that autocalc is on, the system then calculates the updated values for each of the fields that are descendants of the current field, block 630.

In either event, logic continues to test 640 and the activation of the order entry algorithm; if selected, the order of entry formula is executed at block 650. This calculation determines the next field to be processed, if departing from a hierarchial progression. In either case, logic proceeds to test 660 and determines whether the form has been successfully completed; if not, the logic reverses to block 550, via block 670 and repeats the above sequence for the next field in the form (either in sequence or dictated by the order of entry calculation) calling for electronic fill. Otherwise, the form is complete and the system inquires about an export formula, test 680. This permits the user to export the form based data as entered to an external database pursuant to a pre-established path via test 690 and block 700. The logic for this module is terminated at block 710.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a system for the program controlled management of multi-faceted, complex forms containing specified font style and image information, said management system directed to one of plural and format-specific output devices and electronic fill operation, said system comprising:

means for selecting a specific print system output device having a distinct file output format;

means for incrementally reading a form file comprising plural form objects;

means for selectively determining each form object in said form file incompatible with said file output format for said output device;

means for accessing a forms object conversion matrix for converting said incompatible objects into a corresponding object compatible with said format-specific output device;

means for creating an output control file for control of said output device during output in conjunction with said forms file; and means for iteratively processing datablock field locations for electronic completion of designated information.

2. The system of claim 1, wherein said plural output devices comprise a desktop laser printer, a centralized laser printer, and a production offset printer.

3. The system of claim 2, wherein said conversion means includes means for converting font styles in said form file to correspond to said output device.

4. The system of claim 2, wherein said conversion means includes means for converting TIFF and EPS image files to a format corresponding to said output device.

5. The system of claim 4, wherein said converted TIFF and EPS files are stored in said output control file.

6. The system of claim 1, wherein said electronic fill means provides selective on-screen entry of data in accordance with pre-established data fill criteria.

7. The system of claim 6, wherein said pre-established criteria includes data verification and order entry algorithms governing input for said electronic fill means.

8. The system of claim 7, wherein said electronic fill means further comprises imbedded instructions governing the entry or quantification of descendant datablocks.

* * * * *